(12) United States Patent
Sadeck

(10) Patent No.: US 8,146,215 B2
(45) Date of Patent: Apr. 3, 2012

(54) FLEXIBLE CONNECTION AND RELEASE DEVICE AND METHOD

(75) Inventor: James E. Sadeck, East Freetown, MA (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 13/053,365

(22) Filed: Mar. 22, 2011

(65) Prior Publication Data

US 2011/0167613 A1      Jul. 14, 2011

Related U.S. Application Data

(62) Division of application No. 12/220,398, filed on Jul. 3, 2008, now Pat. No. 7,930,808.

(51) Int. Cl.
*A44B 18/00* (2006.01)
(52) U.S. Cl. ............... 24/573.11; 24/265 R; 244/151 A; 244/151 B; 244/151 R
(58) Field of Classification Search ............... 24/573.11, 24/573.09, 602, 265 EC, 265 BC, 265 R, 24/302, 316, 317, 166; 244/151 B, 151 R, 244/151 A
See application file for complete search history.

(56) References Cited

U.S. PATENT DOCUMENTS

| | | | |
|---|---|---|---|
| 1,365,169 | A | 1/1921 | Goldberg |
| 3,380,692 | A | 4/1968 | Gaylord |
| 3,934,848 | A | 1/1976 | Snyder |
| 4,030,689 | A | 6/1977 | Rodriguez |
| 4,337,913 | A | 7/1982 | Booth |
| 4,428,102 | A | 1/1984 | Brownell |
| 4,746,084 | A | 5/1988 | Strong |
| 4,923,150 | A | 5/1990 | Calkins et al. |
| 5,195,223 | A | 3/1993 | Tylaska |
| 5,618,011 | A | 4/1997 | Sadeck et al. |
| 6,056,242 | A | 5/2000 | Collins |
| 6,382,564 | B1 | 5/2002 | Sego, Jr. |
| 6,644,597 | B1 | 11/2003 | Bahniuk |

*Primary Examiner* — Robert J Sandy
*Assistant Examiner* — Rowland D Do
(74) *Attorney, Agent, or Firm* — Roger C. Phillips

(57) ABSTRACT

A flexible connection and release device which allows quick release while under load. The device includes a first link; a second link; a first sling having one end attached to the first link; a second sling having one end attached to the second link; a tab attached to the first sling; a grommet contained in the tab; a curved length of a first flexible cable connected between two fixed points in the first sling on either side of the tab; a second flexible cable; and a pin or a third flexible cable. The links are connected together with multiple turns of the second flexible cable which forms a loop at its center. The curved length of the first flexible cable is passed through the loop in the second flexible cable and through the grommet so that a part of the first flexible cable protrudes from the grommet. The pin or third cable is passed through the protruding part of the first flexible cable to lock the first flexible cable in place.

6 Claims, 4 Drawing Sheets

FLEXIBLE CONNECTION AND RELEASE DEVICE AND METHOD

CROSS REFERENCE TO RELATED APPLICATION

This application is a division of U.S. patent application Ser. No. 12/220,398, filed Jul. 3, 2008, entitled "Flexible Connection and Release Device and Method", now U.S. Pat. No. 7,930,808.

STATEMENT OF GOVERNMENT INTEREST

The invention described herein may be manufactured and used by the U.S. Government for Governmental purposes without the payment of any royalty thereon.

BACKGROUND OF THE INVENTION

This invention relates, in general, to connection and release devices and methods.

In the past, objects have been connected through load-bearing lifting slings that have to be released very quickly under certain circumstances. Safety harnesses, workers' belts, parachute connections, and other like devices connect loads, some of which may weigh thousands of pounds, and all of which may cause a safety hazard if such loads cannot be disconnected from an anchoring object, including a human being. A parachutist or a workman may be connected to a heavy load, and may crash to the ground or in deep water, if conditions permit. A simple disconnect device for easy and quick release can save lives and prevent a catastrophe.

SUMMARY OF THE INVENTION

It is therefore an object of this invention to connect two objects, load bearing or otherwise, through a high strength flexible connection, having a mechanical advantage, which allows easy disconnect or release of these objects from each other even when the connection is subject to high tension forces.

This and other objects of the invention are achieved in one aspect by a flexible connection and release device which allows quick release while under load. The device comprises a first link; a second link; a first sling having one end attached to the first link and another end attached to a first object; a second sling having one end attached to the second link and another end attached to a second object; a tab attached to the first sling; a grommet contained in the tab; a curved length of a first flexible cable connected between two fixed points in the first sling on either side of the tab; a second flexible cable; and a locking means. The links are connected together with multiple turns of the second flexible cable which forms a loop at its center. The curved length of the first flexible cable is passed through the loop in the second flexible cable and through the grommet so that a part of the first flexible cable protrudes from the grommet. The locking means is passed through the protruding part of the first flexible cable to lock the first flexible cable in place.

Another aspect of the invention involves a method of connecting a pair of slings together which allows quick release of the slings while under load, where the first sling has one end attached to a first link, the second sling has one end attached to a second link, a tab is attached to the first sling, a grommet is contained in the tab, and a curved length of a first flexible cable is connected between two fixed points in the first sling on either side of the tab. The method comprises the steps of placing the links together; connecting the links together with multiple turns of a second flexible cable which forms a loop at its center; passing the curved length of the first flexible cable through the loop in the second flexible cable and through the grommet so that a part of the first flexible cable protrudes from the grommet; and locking the first flexible cable in place.

The invention can be employed for connecting barges to tow boats and tug boats to tow cables which have to be released very quickly under certain circumstances. It can also be used to release airdrop loads from aircraft and release parachutes from their payloads. It can be used to restrain cargo containers or payloads which require quick release. This invention may also be used as a quick release on a workman's safety belt.

Additional advantages and features will become apparent as the subject invention becomes better understood by reference to the following detailed description when considered in conjunction with the accompanying drawings wherein:

DETAILED DESCRIPTION

Figure 1:
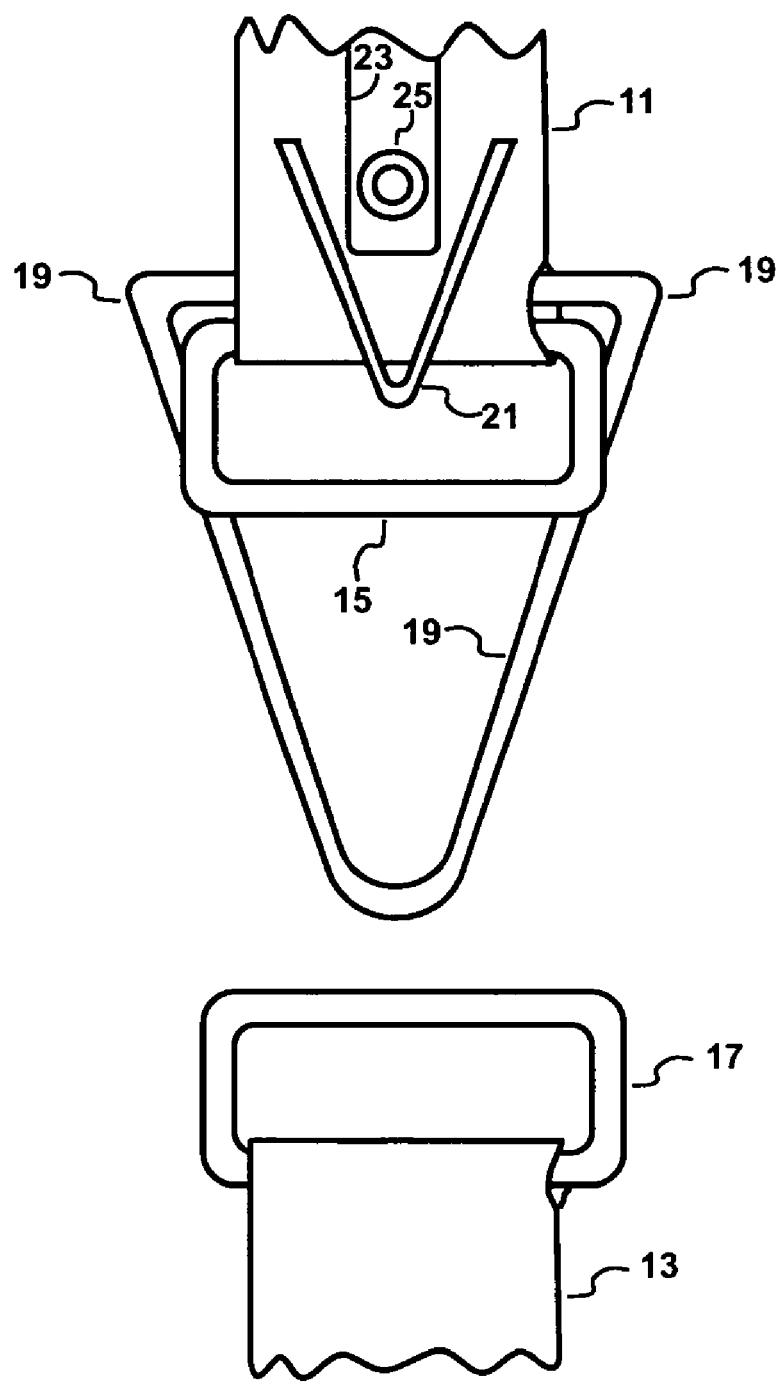
FIG. 1 shows a first embodiment of the flexible connection and release device in its disconnected state.
Figure 2:
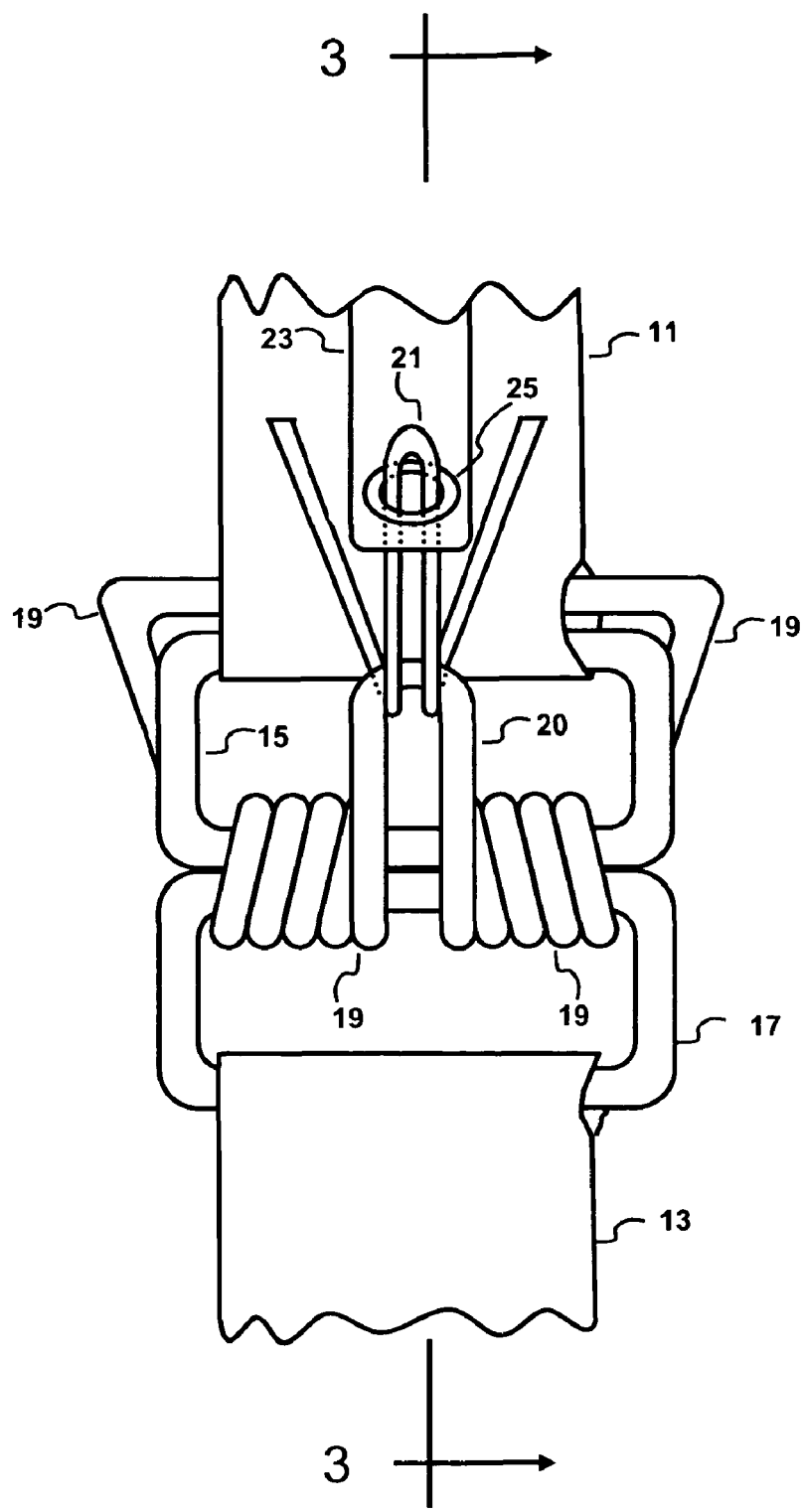
FIG. 2 shows the first embodiment of the flexible connection and release device in its connected state.
Figure 3:
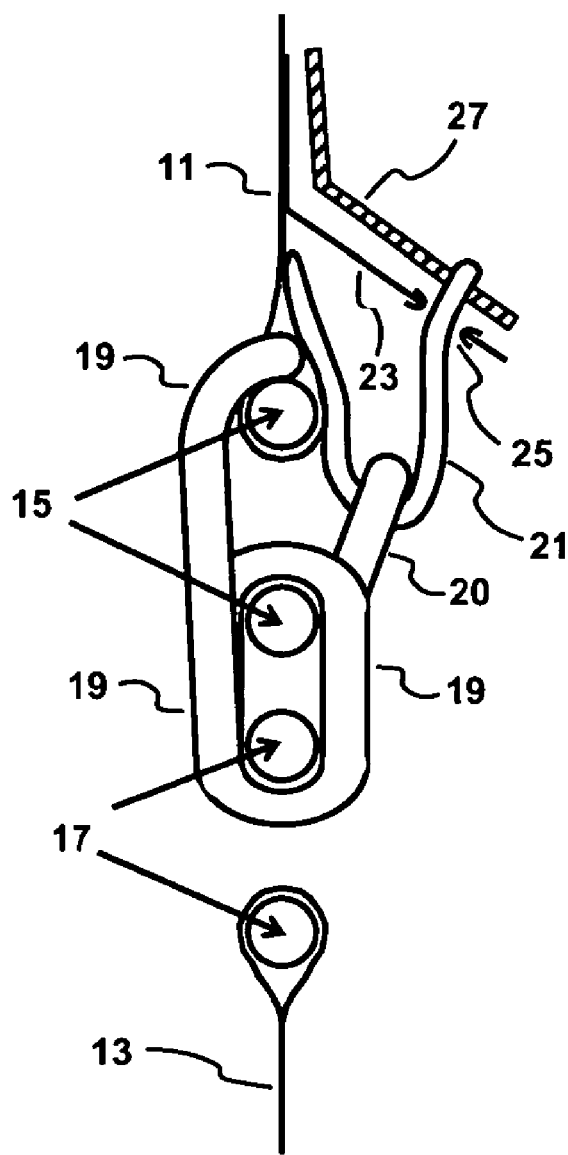
FIG. 3 is a sectional side view taken along lines 3-3 of FIG. 2 in its connected state.

Referring now to the drawings wherein like characters refer to like or corresponding parts, FIGS. 1-3 show an exemplary first embodiment of the invention in the form of a pair of load-bearing lifting slings 11 and 13 which are to be connected together. The slings are constructed of woven textile or wire forming a webbing sling for lifting loads. The first sling 11 has one end attached to a link 15. The second sling 13 has one end attached to a link 17. A tab 23 is attached to the first sling 11, and a grommet 25 is contained in the tab 23. A curved length of a first flexible cable 21 is connected between two fixed points in the first sling on either side of the tab 23.

The inventive method of connecting the slings together which allows quick release of the slings while under load is illustrated as comprising four steps.

In the first step (a), the links 15 and 17 are placed together. (See FIG. 1.)

In the second step (b), the links 15 and 17 are connected together with multiple turns of a second flexible cable 19 which passes through the openings in the links and which forms a loop 20 at its center. (See FIG. 2.)

In the third step (c), the curved length of the first flexible cable 21 is passed through the loop 20 in the second flexible cable 19 (See FIG. 2) and through the grommet 25 so that a part of the first flexible cable protrudes from the grommet. (See FIG. 3.)

In the fourth step (d), the first flexible cable 21 is locked in place by passing a locking means 27 such as, for example, a pin or a cable, through the protruding part of the first flexible cable. (See FIG. 3.)

The slings may be quickly released along with a load being supported by them in one further step (e), wherein the locking means 27 is withdrawn from the protruding part of the first flexible cable 21 to allow the first flexible cable to retract through the grommet 25, whereby the second flexible cable 19 begins to unwind from around the links 15 and 17 with the first flexible cable 21 retracting through the loop in the second flexible cable 19 and the second flexible cable 19 unwinding until both of the links 15 and 17 separate.

Figure 4:
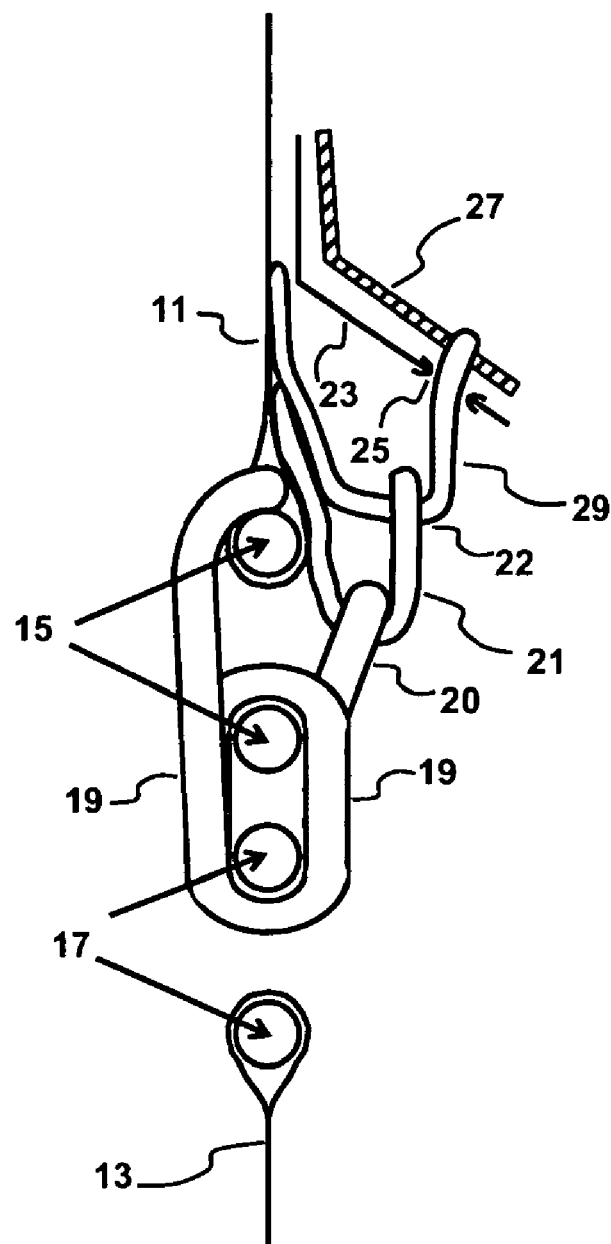
FIG. 4 is a sectional side view of a second embodiment of the flexible connection and release device in its connected state.

The following is an explanation of how the invention works. As described above, and shown in FIGS. 1-3, the links 15 and 17 are placed together and the second flexible cable 19 is wrapped around the unattached sides of the links 15 and 17 by passing it through the opening in the links. The wrapping continues until the proper number of wraps for a particular strength has been achieved. This creates a double block and tackle pulley system controlled by the middle of the second flexible cable 19 which has an 18:1 mechanical advantage. When the first flexible cable 21 is engaged in the loop 20 in the second flexible cable 19, the mechanical advantage becomes 36:1. These ratios are for a frictionless system. The mechanical advantage can be further increased, in fact doubled, in a second embodiment shown in FIG. 4, just by incorporating a curved length of a third flexible cable 29 which is connected between two fixed points in the first sling on either side of the tab 23, and which passes through an opening 22 formed by the curved length of the first flexible cable 21 and through the grommet 25. The assembly is locked by passing the locking means 27 through the protruding part of the third flexible cable 29. The mechanical advantage is now 72:1 for a frictionless system. Additional flexible cables provide greater mechanical advantage.

It is obvious that many modifications and variations of the present invention are possible in light of the above teachings. It is therefore to be understood that within the scope of the appended claims, the invention may be practiced otherwise than as described.

What is claimed as new and desired to be secured by Letters Patent of the United States is:

1. A flexible connection and release device which allows quick release while under load comprising:
   a first link;
   a second link;
   a first sling having one end attached to the first link;
   a second sling having one end attached to the second link;
   a tab attached to the first sling;
   a grommet contained in the tab;
   a curved length of a first flexible cable connected between two fixed points in the first sling on either side of the tab;
   a second flexible cable; and
   locking means,
   wherein the links are connected together with multiple turns of the second flexible cable which forms a loop at its center, the curved length of the first flexible cable is passed through the loop in the second flexible cable and through the grommet so that a part of the first flexible cable protrudes from the grommet; and the locking means is passed through the protruding part of the first flexible cable to lock the first flexible cable in place.

2. The device recited in claim 1 wherein the locking means includes a pin.

3. The device recited in claim 1 wherein the locking means includes a third cable.

4. A method of connecting a pair of slings together which allows quick release of the slings while under load, where the first sling has one end attached to a first link, the second sling has one end attached to a second link, a tab is attached to the first sling, a grommet is contained in the tab, and a curved length of a first flexible cable is connected between two fixed points in the first sling on either side of the tab, the method comprising the steps of:
   placing the links together;
   connecting the links together with multiple turns of a second flexible cable which forms a loop at its center;
   passing the curved length of the first flexible cable through the loop in the second flexible cable and through the grommet so that a part of the first flexible cable protrudes from the grommet; and
   locking the first flexible cable in place.

5. The method recited in claim 4 wherein the first flexible cable is locked in place by passing a pin through the protruding part of the first flexible cable.

6. The method recited in claim 4 wherein the first flexible cable is locked in place by passing a third cable through the protruding part of the first flexible cable.

\* \* \* \* \*